Patented July 1, 1941

2,247,877

UNITED STATES PATENT OFFICE 2,247,877

MANUFACTURE OF SODIUM PHENATE

William Herbert Garrett and Sydney Smith, Llangollen, Wales, assignors to Monsanto Chemical Company, St. Louis, Mo., a corporation of Delaware No Drawing. Application March 12, 1938, Serial No. 195,636. In Great Britain March 18, 1937

12 Claims. (Cl. 260—621)

The invention relates to the production of sodium phenate.

It is the object of the present invention to produce sodium phenate in a form sufficiently pure for the production of salicylic acid.

According to the well known method at present employed for the production of phenol from benzene, the benzene is sulphonated and the benzene sulphonic acid is converted to sodium benzene sulphonate which is fused with sodium hydroxide to give a mass consisting essentially of sodium phenate, sodium hydroxide and sodium sulphite. The fusion mass may be lixiviated with a limited amount of water to give an impure solution of sodium phenate. The free sodium hydroxide in this impure solution may be neutralised with phenol, and the crude mixture used for the manufacture of salicylic acid by evaporation, drying, heating under pressure with carbon dioxide, dissolving the crude sodium salicylate so produced, and precipitating the salicylic acid. It is found in practice, however, that the impurities present in the sodium phenate have a detrimental effect on the conversion of the phenate into salicylate so that the yield of salicylate is low; furthermore, the salicylic acid produced contains harmful impurities.

It has therefore been the practice to adopt an alternative method. The impure sodium phenate solution is acidified to isolate the phenol which is separated and refined, by distillation, and reconverted by reaction with a further amount of sodium hydroxide into sodium phenate which is pure enough for use in the manufacture of salicylic acid. It is found necessary to incur the expense arising from the acidification and the use of the additional amount of sodium hydroxide in order to obtain a good yield of sufficiently pure salicylic acid.

According to the present invention sodium phenate is purified by forming at a temperature above 47° C. a concentrated aqueous solution containing not less than 35% by weight of crude sodium phenate, cooling the solution to a temperature not lower than about 50° C. to precipitate unwanted inorganic salts, removing the precipitate thus obtained, and cooling the solution further to crystallise out sodium phenate hydrate.

The present invention is based on the observations that when a solution of pure sodium phenate in pure water is cooled to effect the crystallisation of sodium phenate trihydrate there is a transition point at about 47° C.; that the transition point in solutions of crude sodium phenate is at about the same temperature; and that the more concentrated the solution the more completely can inorganic salts be precipitated by cooling without precipitating the sodium phenate hydrate provided the temperature is not lowered during the first cooling stage to 47° C.

The presence of sodium hydroxide in the solution has an influence on the solubility of the sodium phenate which is less soluble when the sodium hydroxide is present. In consequence when no sodium hydroxide is present in the solution it is desirable that it should contain a larger proportion of sodium phenate before it is cooled, and conveniently as much as 40% or even a greater percentage by weight of sodium phenate may be present in the solution prior to cooling when no sodium hydroxide is present.

In forming the original solution, either the quantities of water and crude sodium phenate may be so selected as to give the necessary concentration or a relatively dilute solution may be formed and concentrated by evaporation.

The purification process of the present invention may conveniently form a step in the production of salicylic acid, the crude sodium phenate being formed from benzene by sulphonation and fusion with sodium hydroxide. A solution from the fused mass is evaporated down until it contains about 40% of sodium phenate and then allowed to cool to about 50° C. when practically all the inorganic salts are deposited. The salts may be filtered off leaving a solution containing sodium phenate, sodium hydroxide and the sodium salts of certain organic by-products. The solution is then allowed to cool to room temperatures when practically pure crystals of sodium phenate hydrate are deposited. These crystals may be removed by centrifuging and lightly washed with a solution of pure sodium phenate, then dehydrated and heated under pressure with carbon dioxide to form sodium salicylate.

In carrying out the process, the mother liquor from which the sodium phenate hydrate crystals have been removed may be concentrated by evaporation and a second crop of sodium phenate hydrate crystals obtained by cooling. The solution, rich in sodium hydroxide, which remains after the crystallisation of the sodium phenate is conveniently used to provide the sodium hydroxide at an earlier stage in the general process for the production of synthetic phenol from benzene. Thus it may be used for the conversion of the benzene sulphonic acid to sodium benzene sulphonate or for the fusion of the sodium benzene sulphonate, conveniently after reinforcement with solid sodium hydroxide. Before it is so used, the sodium hydroxide solution may be saturated with phenol, conveniently the phenol vapours which are given off from the plant during the process. By such a procedure the evolved phenol vapours are trapped and in addition the presence of the phenol in the sodium hydroxide solution increases the ultimate yield of sodium phenate.

In some circumstances it is convenient to convert the less pure second crop of sodium phenate crystals by acidification into phenol which, after distillation if necessary, may be added to the sodium hydroxide solution.

Whichever of the above steps is adopted, the sodium hydroxide value of the crude sodium phenate solution is utilised and there is a saving on the cost of the sulphuric acid which would be needed for liberation of the phenol if the method normally adopted hitherto were employed.

The purification process of the present invention is applicable to crude sodium phenate obtained by other methods than the sulphonation of benzene, for example it may be applied to the crude sodium phenate obtained by heating chlorbenzene with aqueous sodium hydroxide under pressure.

The process of the present invention is illustrated by the following specific example:

*Example*

Crude sodium benzene sulphonate and sodium hydroxide were fused together and the hot fusion mass run into about its own weight of water. The mixture was well stirred and allowed to cool to about 60° C. and then filtered at that temperature to remove the precipitated inorganic salts, the filtrate was found to have the following composition:

| | Per cent by weight |
|---|---|
| Sodium phenate | 50 |
| Sodium hydroxide | 7 |
| Inorganic salts | 2 |
| Water, plus small amounts of sodium compounds of organic by-products | 41 |
| | 100 |

Twenty-two hundred (2200) kilograms of this filtrate were cooled without agitation. At 47° C. crystals of sodium phenate hydrate were added as "seeds," and the solution was cooled slowly down to about 14° C. The crystals of sodium phenate hydrate were removed by centrifuging, lightly washed with cold water and then melted to give a solution containing 550 kilograms of sodium phenate, that is a 50% yield of the material submitted to purification.

We claim:

1. A process for purifying sodium phenate comprising forming at a temperature materially above 47° C. a concentrated aqueous solution containing not less than 35% by weight of crude sodium phenate, cooling the solution to not lower than about 47° C. to precipitate unwanted inorganic salts, removing the precipitate thus obtained, and cooling the solution further to crystallise out sodium phenate hydrate.

2. The process of claim 1 wherein a solution of greater dilution than required is first formed and then concentrated by evaporation.

3. The process of claim 1 wherein the remaining mother liquor is concentrated by evaporation and then cooled to crystallise out a second crop of sodium phenate hydrate.

4. A process for purifying sodium phenate comprising forming at a temperature materially above 47° C. a concentrated aqueous solution containing not less than 35% by weight of crude sodium phenate and in addition sodium hydroxide whereby the solubility of the sodium phenate is reduced, cooling the solution to not lower than about 47° C. to precipitate unwanted inorganic salts, removing the precipitate thus obtained, and cooling the solution further to crystallise out sodium phenate hydrate.

5. The process of claim 4 wherein a solution of greater dilution than required is first formed and then concentrated by evaporation.

6. The process of claim 4 wherein the remaining moter liquor is concentrated by evaporation and then cooled to crystallise out a second crop of sodium phenate hydrate.

7. A process for the production of purified sodium phenate comprising sulphonating benzene, converting the benzene sulphonic acid to sodium benzene sulphonate, fusing the sodium benzene sulphonate with sodium hydroxide, lixiviating the fusion mass and forming at a temperature materially above 47° C. a concentrated aqueous solution containing not less than 35% by weight of crude sodium phenate, cooling the solution to not lower than about 47° C. to precipitate unwanted inorganic salts, removing the precipitate thus obtained, and cooling the solution further to crystallise out sodium phenate hydrate.

8. The process of claim 7 wherein the mother liquor rich in sodium hydroxide is employed to provide the sodium hydroxide in an earlier stage in the conversion of the benzene to sodium phenate.

9. A process for the production of purified sodium phenate comprising heating chlorbenzene with aqueous sodium hydroxide under pressure, forming at a temperature materially above 47° C. a concentrated aqueous solution containing not less than 35% by weight of the crude sodium phenate so obtained, cooling the solution to not lower than about 47° C. to precipitate unwanted inorganic salts, removing the precipitate thus obtained, and cooling the solution further to crystallise out sodium phenate hydrate.

10. In a process for the production of salicylic acid by heating sodium phenate under pressure with carbon dioxide, the step of purifying the sodium phenate comprising forming at a temperature materially above 47° C. a concentrated aqueous solution containing not less than 35% by weight of crude sodium phenate, cooling the solution to not lower than about 47° C. to precipitate unwanted inorganic salts, removing the precipitate thus obtained, and cooling the solution further to crystallise out sodium phenate hydrate.

11. The process of purifying crude sodium phenate containing inorganic salts formed by conventional processes, the improvement comprising forming at a temperature materially above 47° C. a concentrated aqueous solution containing not less than 35% by weight of the crude sodium phenate so obtained, cooling the solution to not lower than about 47° C. to precipitate unwanted inorganic salts, removing the precipitate thus obtained, and cooling the solution further to crystallise out sodium phenate hydrate.

12. The method of producing substantially anhydrous sodium phenate of a quality suitable for the manufacture of salicylic acid from an aqueous solution of sodium phenate containing water-soluble impurities, characterized in that the aqueous solution is concentrated to at least 35% sodium phenate content and is then filtered while maintaining its temperature at not lower than approximately 47° C. to remove impurities that are not in dissolved form at that temperature and subsequently cooling said filtered solution sufficiently to produce trihydrated crystals of sodium phenate, separating the aqueous mother liquid from the crystals and thereafter dehydrating the crystals.

WILLIAM HERBERT GARRETT.
SYDNEY SMITH.

CERTIFICATE OF CORRECTION.

Patent No. 2,247,877.  July 1, 1941.

WILLIAM HERBERT GARRETT, ET AL.

It is hereby certified that error appears in the printed specification of the above numbered patent requiring correction as follows: Page 2, second column, line 18, claim 6, for "moter" read --mother--; page 3, second column, line 5, claim 12, for "liquid" read --liquor--; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.